US012206146B2

(12) United States Patent
Snygg et al.

(10) Patent No.: US 12,206,146 B2
(45) Date of Patent: Jan. 21, 2025

(54) WAVEGUIDE GASKET ARRANGEMENT

(71) Applicant: Telefonaktiebolaget LM Ericsson (publ), Stockholm (SE)

(72) Inventors: Göran Snygg, Partille (SE); Torbjörn Westin, Partille (SE); Henrik Pettersson, Lindome (SE); Gilbert Johansson, Gothenburg (SE); Jörgen Lundgren, Hövisknäs (SE); Martin Fagerström, Bollebygd (SE); Cecilia Lundin, Stenkullen (SE); Ove Persson, Hunnebostrand (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 275 days.

(21) Appl. No.: 17/797,557

(22) PCT Filed: Feb. 26, 2020

(86) PCT No.: PCT/SE2020/050215
§ 371 (c)(1),
(2) Date: Aug. 4, 2022

(87) PCT Pub. No.: WO2021/173048
PCT Pub. Date: Sep. 2, 2021

(65) Prior Publication Data
US 2023/0053979 A1 Feb. 23, 2023

(51) Int. Cl.
*H01P 1/04* (2006.01)

(52) U.S. Cl.
CPC .................................... *H01P 1/042* (2013.01)

(58) Field of Classification Search
CPC .. H01P 1/042; H01P 1/04; H01P 1/207; H01P 1/209; H01P 1/00; H01P 3/00;
(Continued)

(56) References Cited

U.S. PATENT DOCUMENTS

| | | | |
|---|---|---|---|
| 2,597,081 | A | 5/1952 | Goodhue |
| 2,955,857 | A | 10/1960 | Smith |

(Continued)

FOREIGN PATENT DOCUMENTS

| | | | |
|---|---|---|---|
| FR | 91249 | E | 5/1968 |
| GB | 865591 | A | 4/1961 |
| RU | 2562755 | C2 | 9/2015 |

OTHER PUBLICATIONS

"Application of a Matsumoto-Ohtsuka-type vacuum flange to beam ducts for future accelerators", Mar. 31, 2005, pp. 1, retrieved on Dec. 16, 2019, retrieved from Internet: https://avs.scitation.org/doi/figure/10.1116/1.2101808.

*Primary Examiner* — Stephen E. Jones
(74) *Attorney, Agent, or Firm* — COATS & BENNETT, PLLC

(57) ABSTRACT

The present disclosure relates to a waveguide gasket arrangement (1, 1', 1") arranged for electrically sealing a waveguide interface (2) between a first waveguide end (3) and a second waveguide end (4). The waveguide gasket arrangement (1, 1', 1") comprises a carrier arrangement (5, 5', 5") where a carrier aperture (6; 6*a*, 6*b*) is formed in the mounted carrier arrangement (5, 5', 5"). The waveguide gasket arrangement (1, 1', 1") further comprises an electrically conducting flexible ribbon arrangement (7) that comprises at least one plurality of electrically conducting members (8*a*, 8*b*) forming a coherent common structure. The ribbon arrangement (7) is mounted to a carrier aperture edge (11; 11*a*, 11*b*) that circumvents the carrier aperture (6; 6*a*, 6*b*) such that for each plurality of electrically conducting members (8*a*, 8*b*), a first plurality of electrically conducting members (8*a*) is adapted to extend towards the first waveguide end (3) and a second plurality of electrically conducting members (8*b*) is adapted to extend towards the second waveguide end (4).

6 Claims, 7 Drawing Sheets

(58) Field of Classification Search
CPC .. H01P 3/12; H01P 3/122; H01P 3/127; H01P 3/13; H01P 3/14; H05K 9/0015; H05K 9/0016; H05K 9/0056
See application file for complete search history.

(56) References Cited

U.S. PATENT DOCUMENTS

| | | | |
|---|---|---|---|
| 4,932,673 | A | 6/1990 | Domnikov et al. |
| 5,629,657 | A | 5/1997 | Bayorgeon et al. |
| 5,765,835 | A | 6/1998 | Johnson |
| 6,540,408 | B1 | 4/2003 | Jinnai |
| 2009/0058571 | A1 | 3/2009 | Takemoto et al. |
| 2018/0034124 | A1 | 2/2018 | Bolander et al. |

SECTION A-A

WAVEGUIDE GASKET ARRANGEMENT

TECHNICAL FIELD

The present disclosure relates to wireless communication systems, and in particular to a waveguide gasket arrangement adapted for electrically sealing a waveguide interface.

BACKGROUND

In many fields of wireless communication, such as microwave communication, as well as for applications associated with radars and other sensors using microwave technology, waveguides are used for transporting wireless signals, due to the low losses incurred in a waveguide. When mounting or connecting one waveguide section to another section, there is often a gap between the end-points of the sections.

When there is a gap between two waveguide sections in a waveguide arrangement, the electromagnetic field can partly escape the waveguide arrangement which affects return loss and transition loss, i.e. both unwanted reflections and losses occur. Counteracting such gaps by means of having high manufacturing tolerances is relatively costly, therefore different types of microwave gaskets are commonly used, for example resilient ring gaskets that comprise a conductive material. For example, U.S. Pat. No. 4,932,673 describes a gasket that comprises an electrically conductive elastomeric ring filled with metallic particles. There are also silicon rubber gaskets with conductive material inside. Another solution is RF gaskets where a thin metal plate comprise resilient angled fingers that provide a spring towards against a surface that should be sealed, see for example U.S. Pat. No. 2,597,081.

Such solutions work acceptable for frequencies up to about 20 GHz. For higher frequencies, the waveguide dimensions become relatively small and a resilient gasket tends to expand into the waveguide when compressed, changing the waveguide measures, which affects the transmission properties in an undesired manner. Furthermore, a silicon rubber gasket starts to get lossy for higher frequencies, requiring better and better quality of the silicon rubber to work on higher frequencies which adds significant cost and ends up in a poor trade of price and performance.

There is thus a need for an improved waveguide gasket arrangement that is cost-effective with low losses and low RF leakage while sealing a gap between waveguides in an efficient and reliable manner.

SUMMARY

It is an object of the present disclosure to provide an improved waveguide gasket arrangement that is cost-effective with low losses and low leakage while sealing a gap between waveguides in an efficient and reliable manner.

Said object is obtained by means of a waveguide gasket arrangement arranged for electrically sealing a waveguide interface between a first waveguide end and a second waveguide end. The waveguide gasket arrangement comprises a carrier arrangement where a carrier aperture is formed in the mounted carrier arrangement. The waveguide gasket arrangement further comprises an electrically conducting flexible ribbon arrangement that comprises at least one plurality of electrically conducting members forming a coherent common structure. The ribbon arrangement is mounted to a carrier aperture edge that circumvents the carrier aperture such that for each plurality of electrically conducting members, a first plurality of electrically conducting members is adapted to extend towards the first waveguide end and a second plurality of electrically conducting members is adapted to extend towards the second waveguide end.

Compared to previously known waveguide gasket arrangement, a significantly improved electrical performance is obtained with relatively low manufacturing costs.

According to some aspects, the ribbon arrangement is mounted by clamping the ribbon arrangement to the carrier aperture edge.

In this way, the ribbon arrangement can be securely retained along the carrier aperture edge.

According to some aspects, the electrically conducting members are attached to a common member.

In this way, the ribbon arrangement can be manufactured in one piece.

According to some aspects, the common member comprises fastening pins that are adapted to engage the carrier arrangement.

In this way, the ribbon arrangement can be securely retained along the carrier aperture edge.

According to some aspects, the carrier arrangement is formed in one piece in the form of a sheet.

In this way, the carrier arrangement can be manufactured in a reliable and cost-effective manner.

According to some aspects, the carrier arrangement is formed as at least two separate pieces in the form of at least two separate sheets, where a first piece forms a first part of the carrier aperture and where a second piece forms a second part of the carrier aperture.

In this way, the ribbon arrangement can be easily mounted to the carrier arrangement.

According to some aspects, the carrier arrangement comprises a slot that extends from the carrier aperture edge to an outer edge of the carrier arrangement. The slot is adapted for receiving the ribbon arrangement when the ribbon arrangement is thread onto the carrier aperture edge.

In this way, the ribbon arrangement can be easily mounted to the carrier arrangement while having a carrier arrangement that is formed in one piece.

According to some aspects, the carrier arrangement comprises guiding apertures that are adapted to correspond to flange mounting apertures comprised at the waveguide ends.

In this way, an uncomplicated and reliable electrical sealing to the waveguide interface is obtained.

This object is also obtained by means of methods that are associated with the above advantages.

BRIEF DESCRIPTION OF THE DRAWINGS

The present disclosure will now be described more in detail with reference to the appended drawings, where.

DETAILED DESCRIPTION

Figure 1:
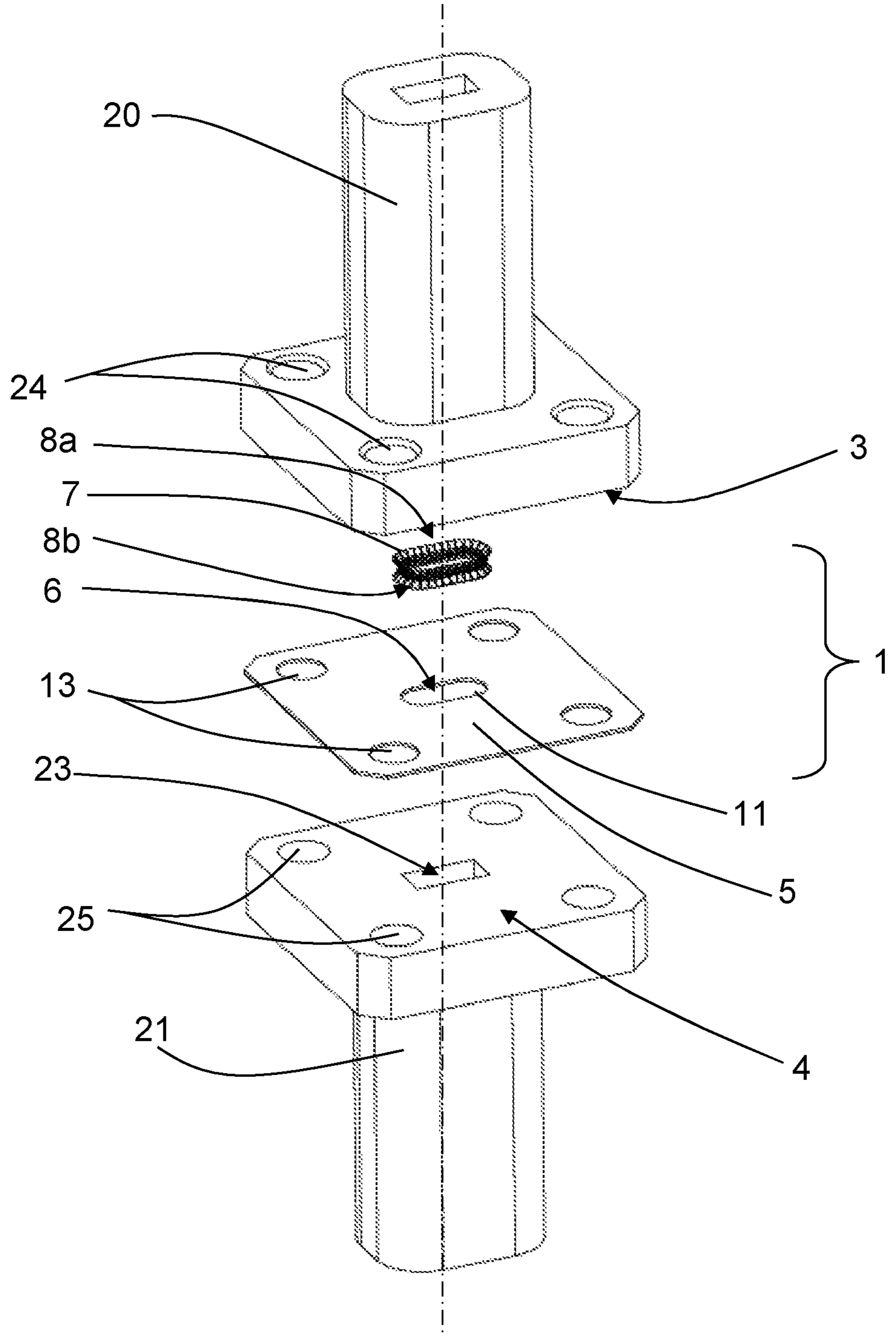
FIG. 1 shows a schematic perspective exploded view of a first example of a waveguide gasket arrangement together with two waveguide parts.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

With reference to FIG. 1, showing a first example, there is a first waveguide part 20 with a first waveguide end 3 and a second waveguide part 21 with a second waveguide end 4, where there further is a waveguide gasket arrangement 1.

With reference also to FIG. 2-FIG. 6, the waveguide gasket arrangement 1 is arranged for electrically sealing a waveguide interface 2 between the first waveguide end 3 and the second waveguide end 4. The waveguide gasket arrangement 1 comprises a carrier arrangement 5 where a carrier aperture 6 is formed in the carrier arrangement 5. The waveguide gasket arrangement 1 further comprises an electrically conducting flexible ribbon arrangement 7 that comprises a plurality of electrically conducting members 8*a*, 8*b* forming a coherent common structure, where the ribbon arrangement 7 is mounted to a carrier aperture edge 11 that circumvents the carrier aperture 6. A first plurality of electrically conducting members 8*a* is adapted to extend towards the first waveguide end 3, and a second plurality of electrically conducting members 8*b* is adapted to extend towards the second waveguide end 4. The carrier aperture 6 is adapted to correspond to waveguides apertures 22 (only one shown).

According to some aspects, the ribbon arrangement 7 is mounted to the carrier arrangement 5 by clamping the ribbon arrangement 7 to the carrier aperture edge 11.

Figure 2:
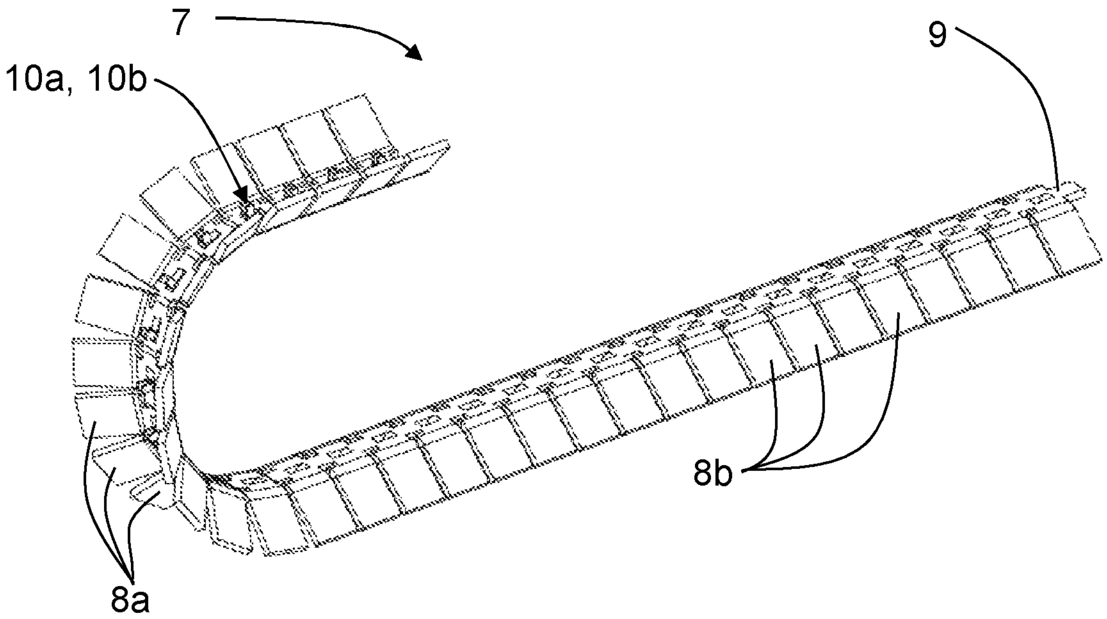
FIG. 2 shows a schematic perspective view of an open ribbon arrangement.
Figure 3:
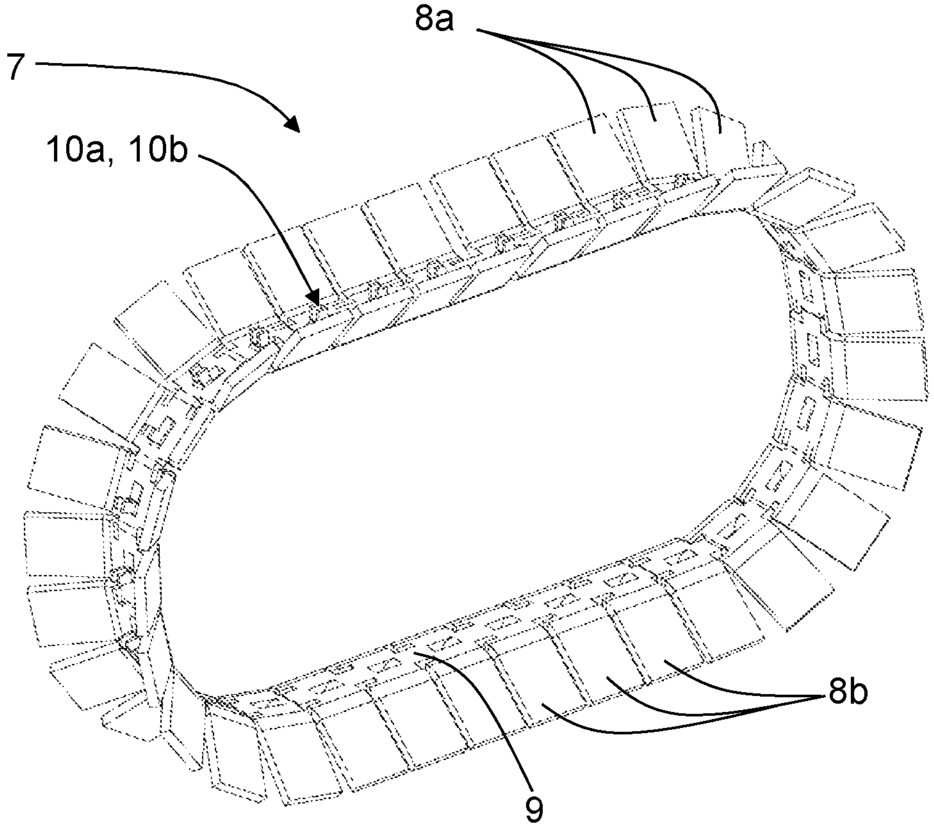
FIG. 3 shows a schematic perspective view of a closed ribbon arrangement.
Figure 4:
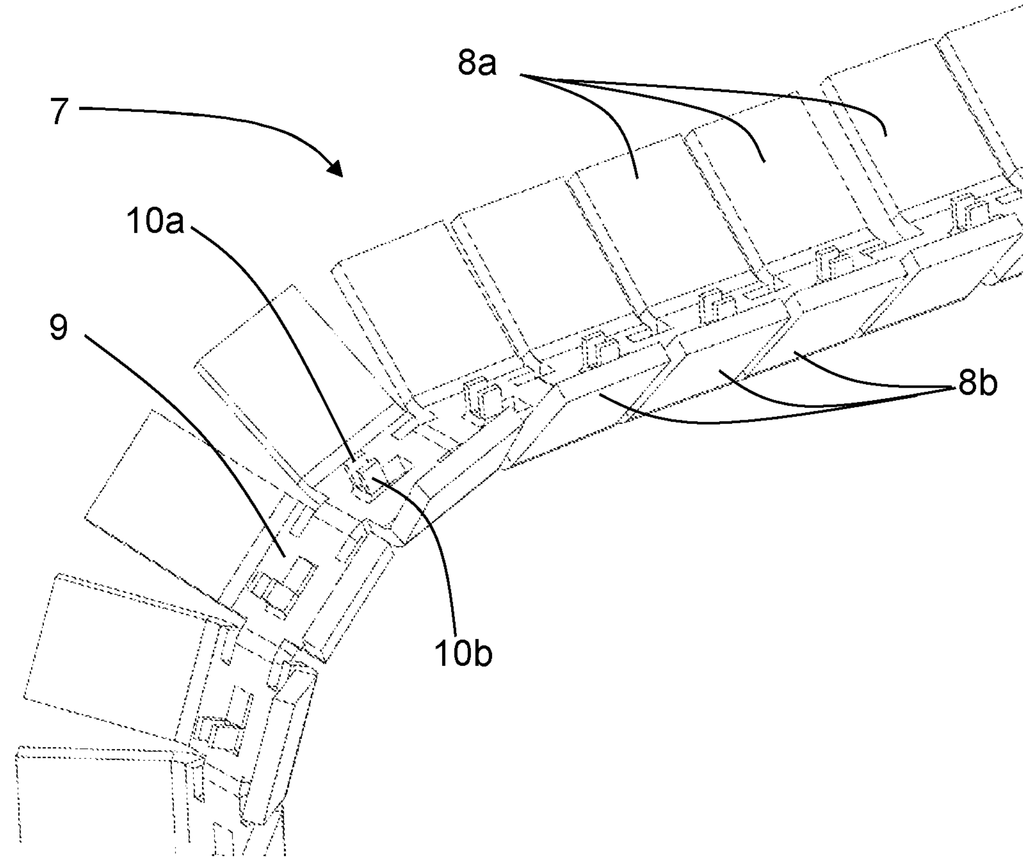
FIG. 4 shows a schematic detail perspective view of a ribbon arrangement.

According to some aspects, the electrically conducting members 8*a*, 8*b* are attached to a common member 9 as clearly indicated in FIG. 2 that shows a ribbon arrangement 7 with open ends, FIG. 3 that shows a ribbon arrangement 7 in a closed position and FIG. 4 that shows a detail of the ribbon arrangement 7. According to some further aspects, the common member 9 comprises fastening pins 10*a*, 10*b* that are adapted to engage the carrier arrangement 5, where the fastening pins 10*a*, 10*b* are best shown in FIG. 4.

Figure 5:
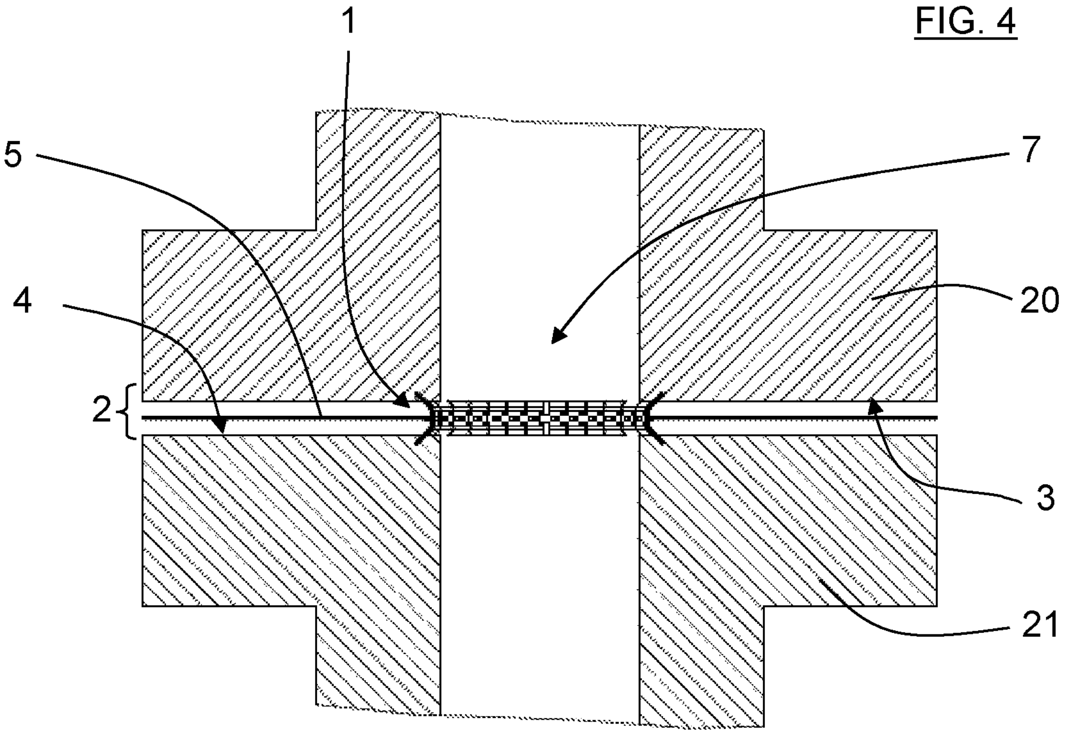
FIG. 5 shows a schematic section side view of a waveguide gasket arrangement in a waveguide interface.
Figure 6:
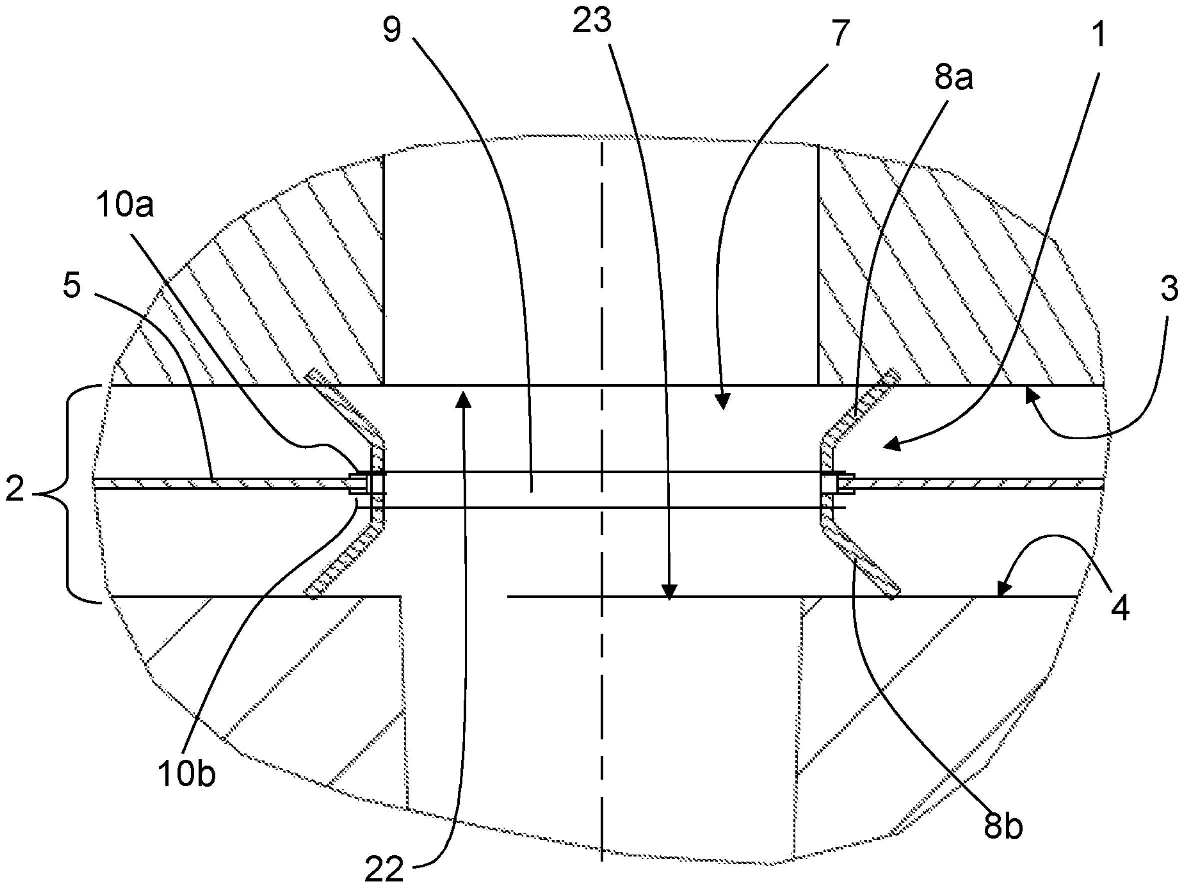
FIG. 6 shows a schematic detail view of section side view of a waveguide gasket arrangement in a waveguide interface.

FIG. 1 shows an exploded view of the waveguide parts 20, 21 and the waveguide gasket arrangement 1, and FIG. 5 shows a section side view of the mounted waveguide parts 20, 21 with the intermediate waveguide gasket arrangement 1 electrically sealing the waveguide interface 2 between the first waveguide end 3 and the second waveguide end 4. This is shown in greater detail in FIG. 6 where the fastening pins 10*a*, 10*b* are shown engaging the carrier arrangement 5. It is here shown that the waveguide gasket arrangement 1 does not extend into any one of the waveguide apertures 22, 23, and does thus not affect the transmission properties between the waveguide parts 20, 21.

According to some aspects, the carrier arrangement 5 is formed in one piece in the form of a sheet, as shown in FIG. 1.

Figure 7:
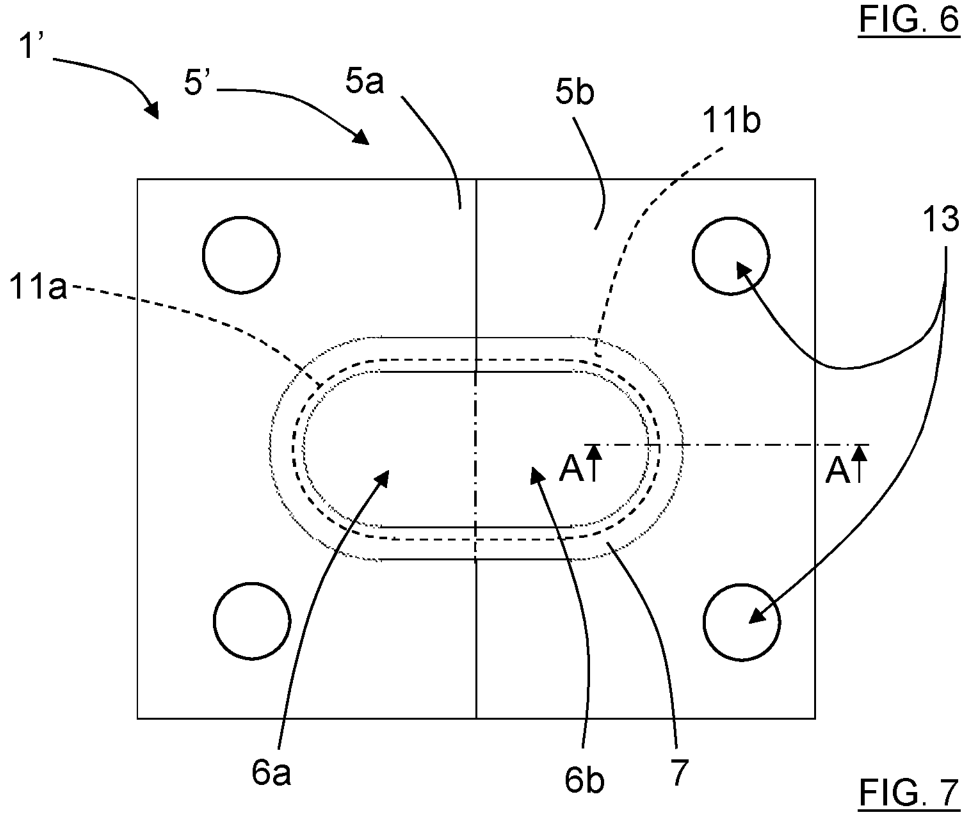
FIG. 7 shows a schematic top view of an example of a waveguide gasket arrangement according to a second example.
Figure 8:
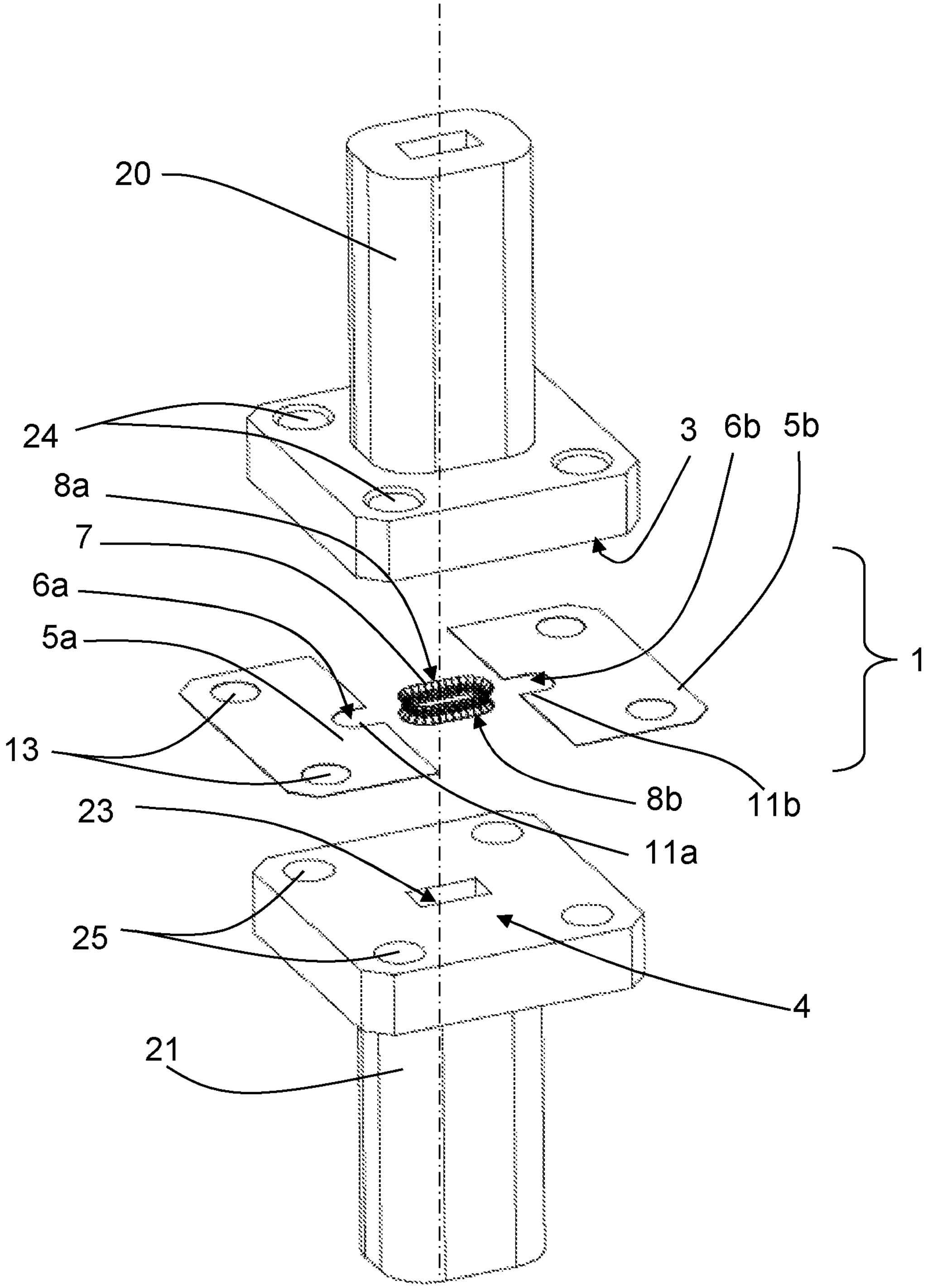
FIG. 8 shows a schematic perspective exploded view of the second example of a waveguide gasket arrangement together with two waveguide parts.

FIG. 7 and FIG. 8 illustrate a second example, where FIG. 8 mainly corresponds to FIG. 1. Here, the carrier arrangement 5' is formed as two separate pieces 5*a*, 5*b* in the form of two separate sheets, where a first piece 5*a* forms a first part 6*a* of the carrier aperture and where a second piece 5*b* forms a second part 6*b* of the carrier aperture. In this way, the ribbon arrangement 7 can more easily be mounted in the carrier aperture. The ribbon arrangement 7 can first be mounted to the first part 6*a* of the carrier aperture, and then to the second part 6*b* of the carrier aperture when the two separate pieces 5*a*, 5*b* are brought together as shown in FIG. 7.

The carrier arrangement 5' can also be formed as more than the two separate pieces 5*a*, 5*b* described above.

Figure 9:
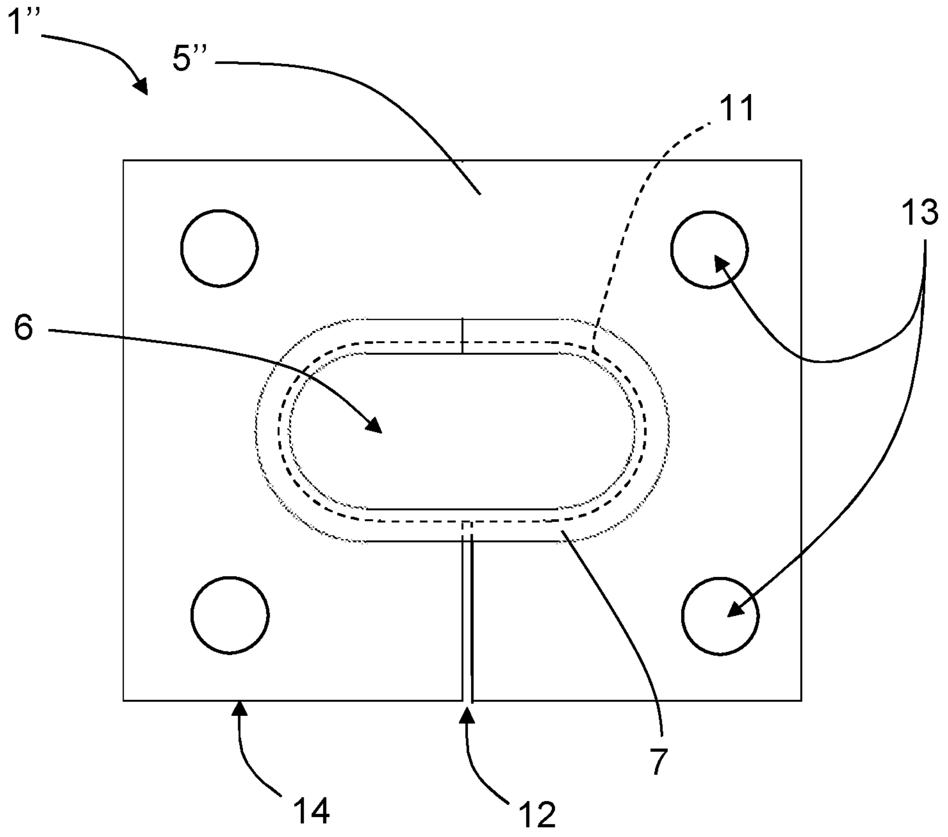
FIG. 9 shows a schematic top view of an example of a waveguide gasket arrangement according to a third example.

FIG. 9 shows a further example of a carrier arrangement 5" that is formed in one piece and comprises a slot 12 that extends from the carrier aperture edge 11 to an outer edge 14 of the carrier arrangement 5". The slot 12 is adapted to receive the ribbon arrangement 7 when the ribbon arrangement 7 is thread onto the carrier aperture edge 11. In this way, the mounting of the ribbon arrangement 7 is alleviated while keeping the carrier arrangement 5" in one piece. According to some aspects, the slot 12 may have a certain width, or only be constituted by a cut in the material of the carrier arrangement 5". The slot 12 may have any suitable orientation, but should connect the outer edge 14 to the carrier aperture edge 11 such that the ribbon arrangement 7 can be fed via the slot 12 to be thread along the carrier aperture edge 11.

According to some aspects, the carrier arrangement 5, 5' 5" comprises guiding apertures 13 that are adapted to correspond to flange mounting apertures 24, 25 comprised at the waveguide ends 3, 4. Securing bolts can be inserted through the flange mounting apertures 24, 25 and the intermediate guiding apertures 13, enabling the waveguide parts 20, 21 to be secured and mounted to each other, while keeping the intermediate waveguide gasket arrangement 1, 1', 1" in the proper position.

The flexible ribbon arrangement 7 comprises at least one plurality of electrically conducting members 8*a*, 8*b*, forming a coherent common structure. this means that the flexible ribbon arrangement 7 may comprise two or more parts or ribbon sub-arrangement that together form the flexible ribbon arrangement 7. Having two or more parts may alleviate mounting of the ribbon arrangement 7 to the carrier arrangement 5.

The flexible ribbon arrangement 7 can be manufactured as long ribbons that are stored as rolls and sold by the meter, and can for example be manufactured by means of punching or cutting. The flexible ribbon arrangement 7 can also be manufactured as smaller pieces. According to some aspects, the flexible ribbon arrangement 7 is manufactured as an injected molded plastic part that has been metalized or made electrical conductive in any other way. Electrically conductive plastic materials are also conceivable. Depending on the manufacturing method chosen, the details of the flexible ribbon arrangement 7 such as the conducting members 8*a*,

8*b*, the common member 9 and possible fastening pins 10*a*, 10*b* are suitably designed to alleviate manufacture. For example, a punching procedure benefits from a suitably adapted design of the details of the flexible ribbon arrangement 7, such that a punching tool can perform the punching in one work step.

Figure 10:
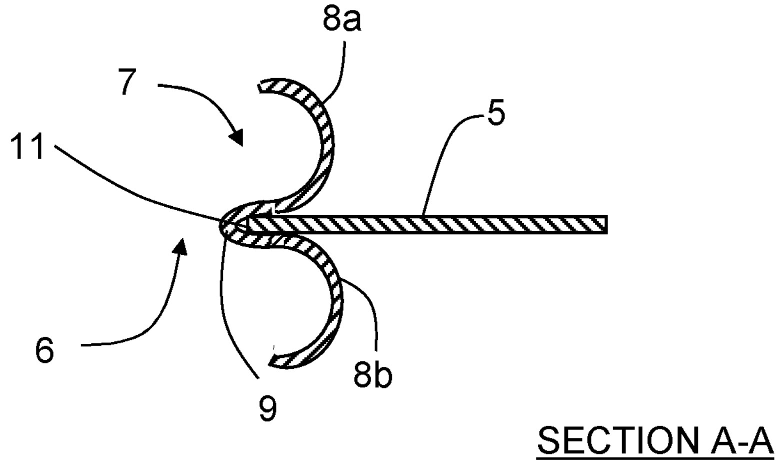
FIG. 10 shows a schematic section side view of a ribbon arrangement attached to a carrier arrangement.

An additional example of a flexible ribbon arrangement 7 is shown in FIG. 10 that illustrate a section indicated in FIG. 7. A plurality of arcuate fingers 8*a*, 8*b* are attached to an arcuate common member 9 such that the flexible ribbon arrangement 7 is formed in one piece, where the arcuate common member 9 is adapted to receive and retain the carrier arrangement 5. Here, the ribbon arrangement 7 is clamped to the carrier aperture edge 11. This is of course only an additional example of a flexible ribbon arrangement 7 and does not limit the flexible ribbon arrangement in FIG. 7, which of course can be of any suitable type as discussed above.

Figure 11:
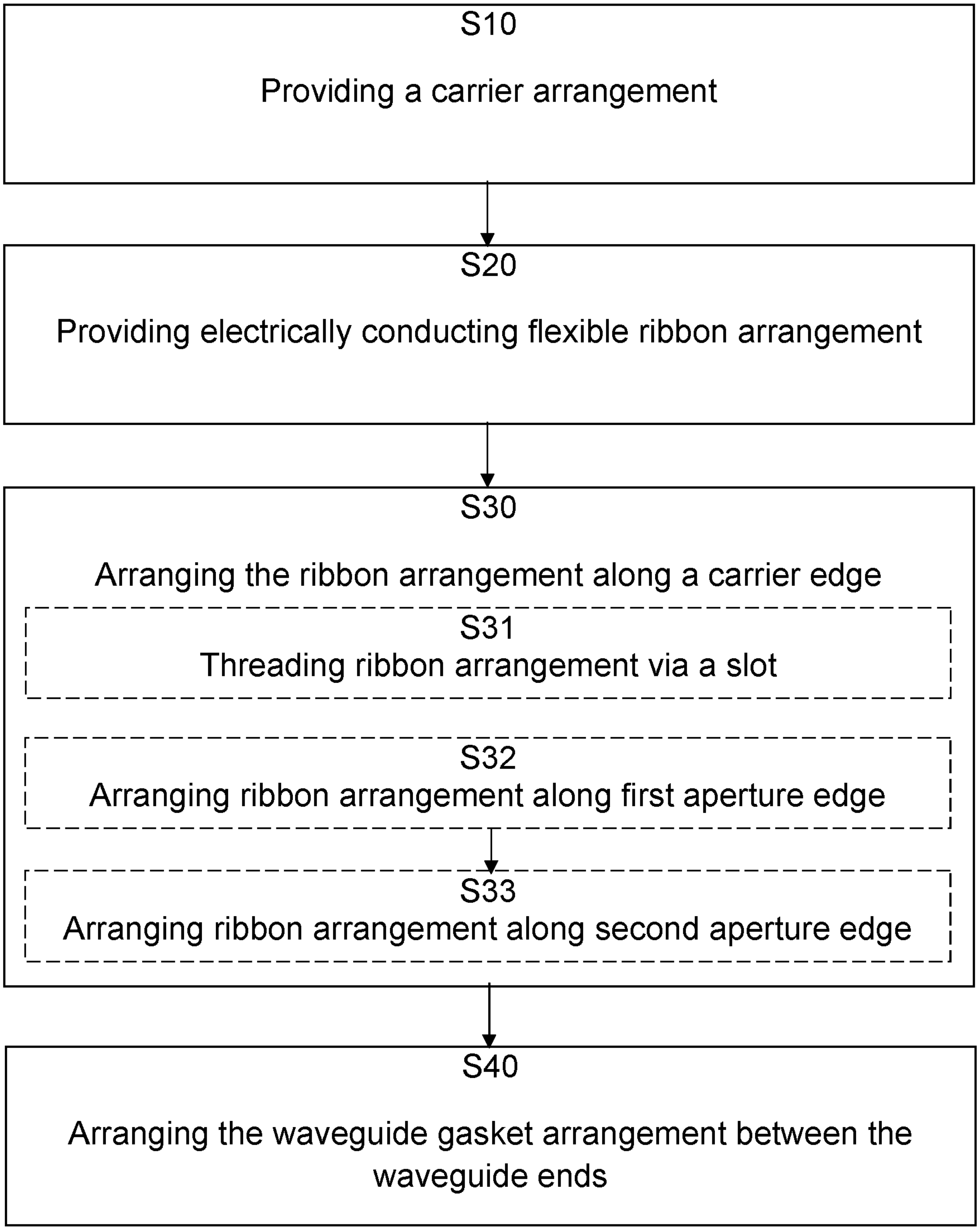
FIG. 11 shows a flowchart for methods according to the present disclosure.

With reference to FIG. 11, the present disclosure also relates to ta method for configuring a waveguide interface 2 having a first waveguide end 3, a second waveguide end 4 and a waveguide gasket arrangement 1, 1', 1". The method comprises providing S10 a carrier arrangement 5, 5', 5" where a carrier aperture 6; 6*a*, 6*b* is formed in the mounted carrier arrangement 5, 5', 5", and providing S20 an electrically conducting flexible ribbon arrangement 7 that comprises at least one plurality of electrically conducting members 8*a*, 8*b* forming a coherent common structure. The method further comprises arranging S30 the ribbon arrangement 7 along a carrier aperture edge 11; 11*a*, 11*b* that circumvents the carrier aperture 6; 6*a*, 6*b* such that the waveguide gasket arrangement 1, 1', 1" is formed, and arranging S40 the waveguide gasket arrangement 1, 1', 1" between the first waveguide end 3 and the second waveguide end 4. For each plurality of electrically conducting members 8*a*, 8*b*, a first plurality of electrically conducting members 8*a* is adapted to extend towards the first waveguide end 3 and a second plurality of electrically conducting members 8*b* is adapted to extend towards the second waveguide end 4.

According to some aspects, arranging S30 the ribbon arrangement 7 comprises threading S31 the ribbon arrangement 7 via a slot 12 that extends from the carrier aperture edge 11 to an outer edge 14 of the carrier arrangement 5".

According to some aspects, the method comprises arranging S32 the ribbon arrangement 7 along a first carrier aperture edge 11*a*, and arranging S33 the ribbon arrangement 7 along a second carrier aperture edge 11*b* when bringing together two separate pieces 5*a*, 5*b* of the carrier arrangement 5'. A first piece 5*a* forms a first part 6*a* of the carrier aperture and where a second piece 5*b* forms a second part 6*b* of the carrier aperture.

The present disclosure is not limited to the examples described above, but may vary freely within the scope of the appended claims. For example, the ribbon arrangement 7 can have any suitable shape and can be manufactured in many ways, even in different materials. The first plurality of electrically conducting members 8*a* and the second plurality of electrically conducting members 8*b* can be grouped in any suitable manner, for example every second electrically conducting member can belong to the first plurality of electrically conducting members 8*a*, and every other second electrically conducting member can belong to the second plurality of electrically conducting members 8*b*.

According to some aspects, the carrier arrangement 5, 5', 5" can be made as a thin metal plate, or as a thin sheet made in plastic, or any other non-conducting material. According to some aspects, the carrier arrangement 5, 5', 5" can be made by means of punching or cutting in a sheet material.

The ribbon arrangement 7 has been described to be mounted to the carrier arrangement 5 by clamping the ribbon arrangement 7 to the carrier aperture edge 11, or by means of fastening pins. Naturally, the ribbon arrangement 7 can be attached to the carrier aperture edge 11 in many ways, where different types of fastening pins or other holding arrangements, as well as glue, can be used.

The present disclosure relates to a waveguide gasket arrangement 1, 1', 1" arranged for electrically sealing a waveguide interface 2 between a first waveguide end 3 and a second waveguide end 4. The waveguide gasket arrangement 1, 1', 1" comprises a carrier arrangement 5, 5', 5" where a carrier aperture 6; 6*a*, 6*b* is formed in the mounted carrier arrangement 5, 5', 5". The waveguide gasket arrangement 1, 1', 1" further comprises an electrically conducting flexible ribbon arrangement 7 that comprises at least one plurality of electrically conducting members 8*a*, 8*b* forming a coherent common structure. The ribbon arrangement 7 is mounted to a carrier aperture edge 11; 11*a*, 11*b* that circumvents the carrier aperture 6; 6*a*, 6*b* such that for each plurality of electrically conducting members 8*a*, 8*b*, a first plurality of electrically conducting members 8*a* is adapted to extend towards the first waveguide end 3 and a second plurality of electrically conducting members 8*b* is adapted to extend towards the second waveguide end 4.

According to some aspects, the ribbon arrangement 7 is mounted by clamping the ribbon arrangement 7 to the carrier aperture edge 11.

According to some aspects, the electrically conducting members 8*a*, 8*b* are attached to a common member 9.

According to some aspects, the common member 9 comprises fastening pins 10*a*, 10*b* that are adapted to engage the carrier arrangement 5.

According to some aspects, the carrier arrangement 5 is formed in one piece in the form of a sheet.

According to some aspects, the carrier arrangement 5' is formed as at least two separate pieces 5*a*, 5*b* in the form of at least two separate sheets, where a first piece 5*a* forms a first part 6*a* of the carrier aperture and where a second piece 5*b* forms a second part 6*b* of the carrier aperture.

According to some aspects, the carrier arrangement 5" comprises a slot 12 that extends from the carrier aperture edge 11 to an outer edge 14 of the carrier arrangement 5", where the slot 12 is adapted for receiving the ribbon arrangement 7 when the ribbon arrangement 7 is thread onto the carrier aperture edge 11.

According to some aspects, the carrier arrangement comprises guiding apertures 13 that are adapted to correspond to flange mounting apertures 24, 25 comprised at the waveguide ends 3, 4.

The invention claimed is:

1. A waveguide gasket arrangement arranged for electrically sealing a waveguide interface between a first waveguide end and a second waveguide end, the waveguide gasket arrangement comprising:

a carrier arrangement having a carrier aperture formed in the carrier arrangement, wherein the carrier arrangement is formed as at least two separate pieces in the form of at least two separate sheets, where a first piece forms a first part of the carrier aperture and where a second piece forms a second part of the carrier aperture; and an electrically conducting flexible ribbon arrangement comprising at least one plurality of electrically conducting members forming a coherent common structure, wherein the flexible ribbon arrangement is mounted to a carrier aperture edge that circumvents the carrier aperture such that for each plurality of electrically conducting members, a first plurality of electrically conducting members is configured to extend towards the first waveguide end and a second plurality of electrically conducting members is configured to extend towards the second waveguide end.

2. The waveguide gasket arrangement according to claim 1, wherein the flexible ribbon arrangement is mounted by clamping the flexible ribbon arrangement to the carrier aperture edge.

3. The waveguide gasket arrangement according to claim 1, wherein the electrically conducting members are attached to a common member.

4. The waveguide gasket arrangement according to claim 3, wherein the common member comprises fastening pins that are configured to engage the carrier arrangement.

5. The waveguide gasket arrangement according to claim 1, wherein the carrier arrangement comprises guiding apertures configured to correspond to flange mounting apertures comprised at the first and second waveguide ends.

6. A method for configuring a waveguide interface having a first waveguide end, a second waveguide end, and a waveguide gasket arrangement, the method comprising:

providing a carrier arrangement having a carrier aperture formed therein, wherein the carrier arrangement comprises a first piece and a second piece separate from the first piece;

providing an electrically conducting flexible ribbon arrangement comprising at least two pluralities of electrically conducting members forming a coherent common structure;

arranging the flexible ribbon arrangement along a carrier aperture edge that circumvents the carrier aperture such that the waveguide gasket arrangement is formed, wherein arranging the flexible ribbon arrangement comprises:

arranging the flexible ribbon arrangement along a first carrier aperture edge; and arranging the flexible ribbon arrangement along a second carrier aperture edge when bringing together the first and second pieces of the carrier arrangement, wherein the first piece forms a first part of the carrier aperture and wherein the second piece forms a second part of the carrier aperture;

arranging the waveguide gasket arrangement between the first waveguide end and the second waveguide end such that that, for each plurality of electrically conducting members, a first plurality of electrically conducting members is configured to extend towards the first waveguide end and a second plurality of electrically conducting members is configured to extend towards the second waveguide end.

* * * * *